J. BELANGER.
TRACTION AND ANTISKIDDING DEVICE FOR AUTOMOBILES.
APPLICATION FILED DEC. 6, 1919.
1,344,853.
Patented June 29, 1920.
2 SHEETS—SHEET 1.
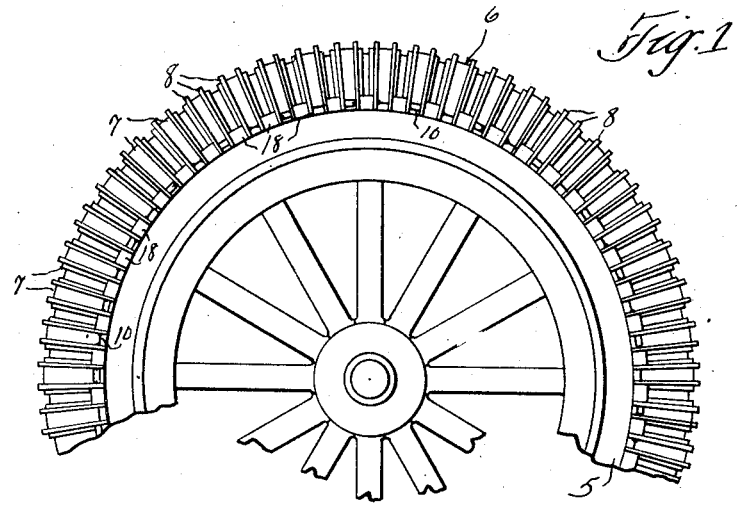
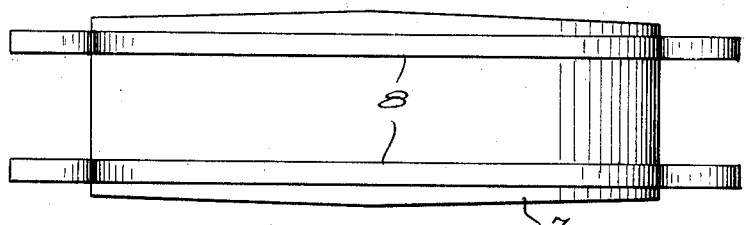
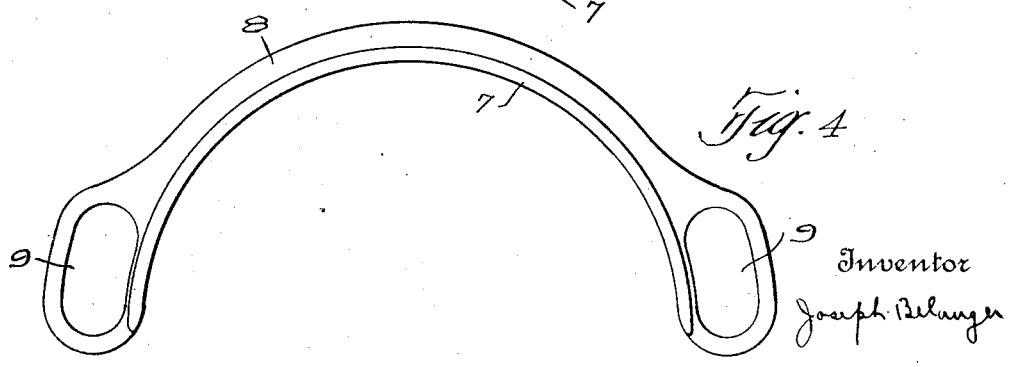

J. BELANGER.
TRACTION AND ANTISKIDDING DEVICE FOR AUTOMOBILES.
APPLICATION FILED DEC. 6, 1919.
1,344,853.
Patented June 29, 1920.
2 SHEETS—SHEET 2.
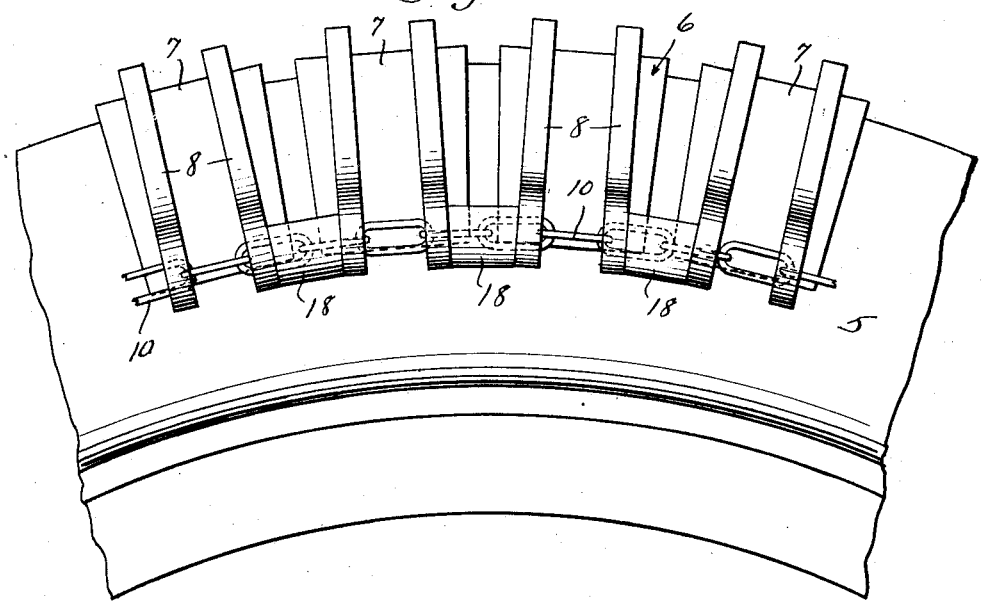
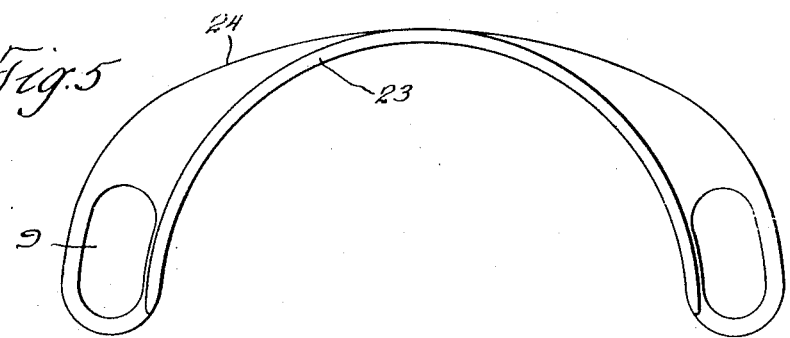
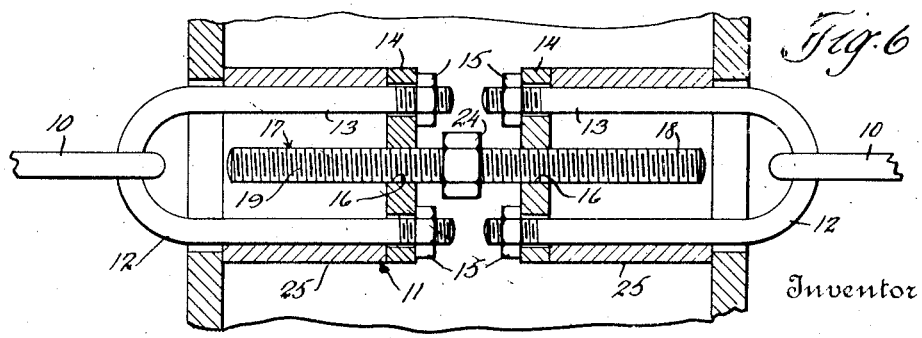
Inventor
Joseph Belanger
By William C. Linton
Attorney

UNITED STATES PATENT OFFICE.

JOSEPH BELANGER, OF BUTTE, MONTANA.

TRACTION AND ANTISKIDDING DEVICE FOR AUTOMOBILES.

1,344,853.  Specification of Letters Patent.  Patented June 29, 1920.

Application filed December 6, 1919. Serial No. 342,932.

*To all whom it may concern:*

Be it known that I, JOSEPH BELANGER, a citizen of the United States of America, residing at Butte, in the county of Silver Bow and State of Montana, have invented certain new and useful Improvements in Traction and Antiskidding Devices for Automobiles, of which the following is a specification.

My invention relates to traction and antiskidding devices for automobiles.

The object of the invention is to provide an attachment for the ordinary pneumatic tire which will increase traction and prevent skidding.

Another object is to provide an attachment for pneumatic tires which will to a great extent obviate the inconvenience incident to punctures.

Other and further objects of the invention will be in part described as the specification is proceeded with.

In the accompanying drawings wherein the preferred embodiment of my invention is shown:

Figure 1 is a side elevation of the invention;

Fig. 2 is an enlarged side elevation of the invention;

Fig. 3 is a plan view of a single shoe detached;

Fig. 4 is a side elevation of a single shoe detached;

Fig. 5 is a side elevation of a modified form of shoe detached; and

Fig. 6 is a detail view of the coupling.

Referring more specifically to the drawings, 5 denotes a pneumatic tire of usual construction and 6 a sectional annular band made up of sections or shoes 7.

Each shoe 7 is of comparatively thin metal cast or otherwise formed of substantially U-shape. In other words the shoes 7 are shaped to snugly fit or conform to the peripheral shape of the tire 5. These shoes are formed with spaced parallel transversely extending ribs or flanges 8, enlarged at their extremities and formed with apertures 9 for a purpose about to be described. The U-shaped shoes or sections 7 are connected together by side chains 10 which pass through the apertures 9 and are connected together by adjustable couplings 11. These couplings comprise U-shaped links 12, the legs 13 of which are threaded to receive a plate 14 and clamping nuts 15 and spacing blocks 25. The plates 14 are provided with centrally disposed threaded apertures 16 into which screws a bar 17 having oppositely disposed right and left handed threads 18 and 19. A thumb piece 24 is provided intermediate the ends of the bar 17 whereby the latter may be readily turned to the right or left for the purpose of adjusting the sectional annular band 6 about the tire 5. It will thus be seen that when the shoes or sections 7 have been placed upon the chains 10 that the annular band 6 thus formed can be readily adjusted to any sized tire by merely inserting the threaded rod 17 into apertures 16 of opposing coupling plates 14 and rotating the rods 7 until the proper tension of chains 10 is obtained.

It will be noted that the shoes or sections 7 are widest at their medial or tread portion and taper gradually toward their extremities so that the side edges of one shoe or section will be uniformly parallel or in the same vertical plane with the side edges of the next adjacent shoe. In order to prevent pinching of the tire between adjacent shoes or sections, spacing blocks 18 are provided through which the chains 10 pass. These spacing blocks are slightly larger in diameter than the apertures 9 in the ribs or flanges 8 and consequently cannot be drawn therethrough.

In Fig. 5 I have illustrated a modified form of shoe or section 23 in which the flanges or ribs 24 do not extend to the tread portion of the shoe, being formed merely adjacent the ends thereof. This form of shoe is designed particularly for summer use or under conditions where sufficient traction is had from this form of interrupted flange.

The shoes 7 are identical in size and shape with the exception that the particular shoe at the points of coupling will be considerably wider than the other shoes in order to prevent bending or breaking of the coupling rod 17 due to buckling of the shoes at these points.

From the foregoing it will be seen that the shoes not only provide increased traction but also materially protect the tire against puncture by nails, sharp stones or the like.

Having thus described my invention, what I claim is:

A device of the character described comprising a plurality of substantially U- shaped spaced shoes adapted to conform to the shape of an ordinary pneumatic tire, spaced traction ribs on said shoes, adapted to engage the road surface, said ribs being enlarged at their extremities and provided with apertures in said enlargements, apertured spacing blocks between said enlargements on said ribs of adjacent shoes, securing means adapted to pass through the apertures in said ribs and blocks, and adjustable means connecting the ends of said chains together.

In witness whereof I have hereunto set my hand.

JOSEPH BELANGER.